March 30, 1965     R. O. GUNDERSON ETAL     3,176,144
SELECTIVE SIGNALING SYSTEM
Filed Nov. 16, 1960     3 Sheets-Sheet 2
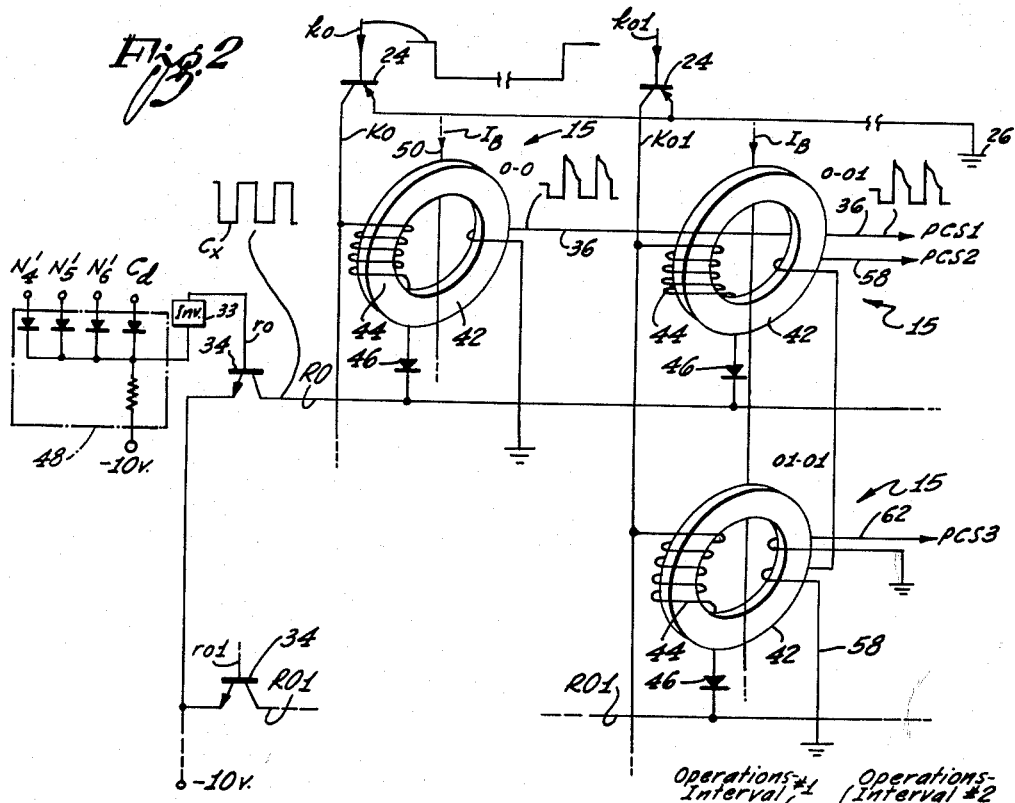
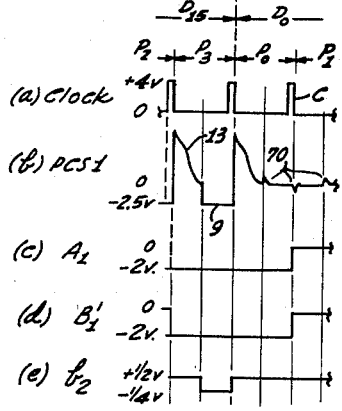
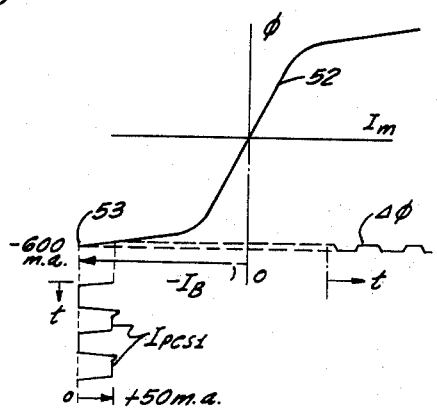
INVENTORS:
Robert O. Gunderson
Edmund F. Klein
By Louis A. Kline
John J. Matlago
Their Attorneys March 30, 1965 R. O. GUNDERSON ETAL 3,176,144
SELECTIVE SIGNALING SYSTEM
Filed Nov. 16, 1960 3 Sheets-Sheet 3
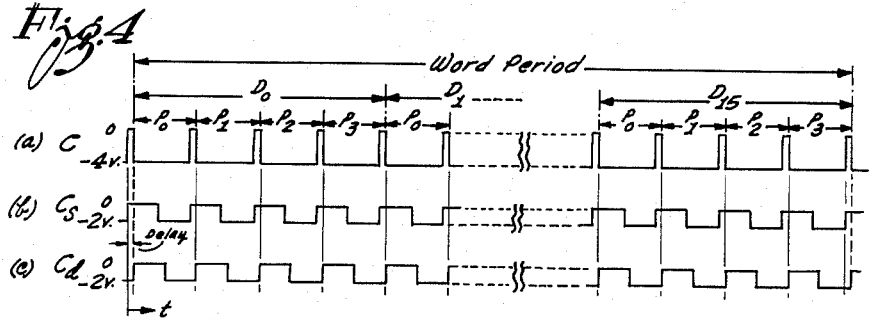
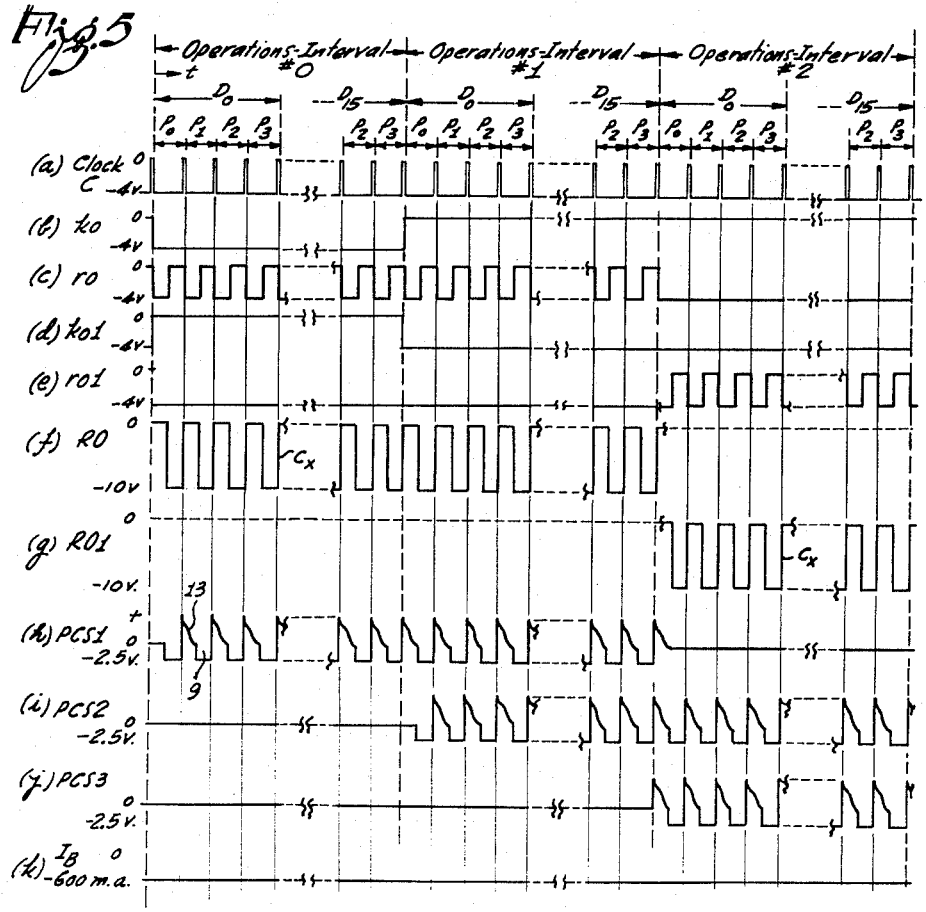
INVENTORS:
Robert O. Gunderson
Edmund F. Klein
Louis A. Kline
John T. Matlago
Their Attorneys.

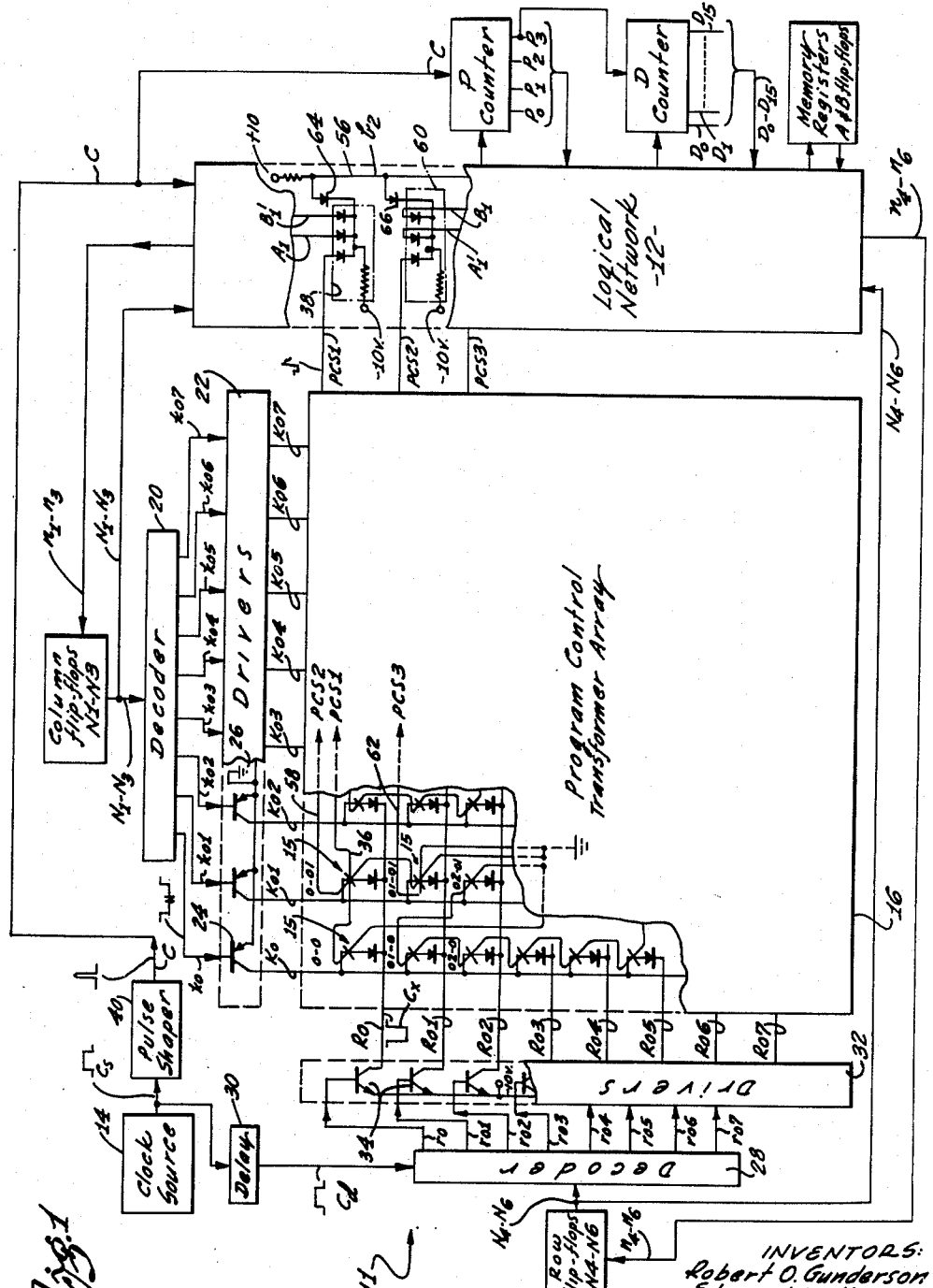

United States Patent Office 3,176,144
Patented Mar. 30, 1965

3,176,144
SELECTIVE SIGNALING SYSTEM
Robert O. Gunderson, Torrance, and Edmund F. Klein, San Pedro, Calif., assignors to The National Cash Register Company, Dayton, Ohio, a corporation of Maryland
Filed Nov. 16, 1960, Ser. No. 69,759
12 Claims. (Cl. 307—88)

The present invention is directed to a selective signaling system, and more particularly to circuit means for selectively coupling control signals to predetermined circuits or networks.

In the prior art it is known how all the processes performable by a data processor can be divided so as to be carried out in sequential operation intervals. The logical networks for carrying out the processes are controlled by a variable sequence program control apparatus which selectively renders certain of the logical networks to be operable during each operations-interval. Generally, each operations-interval corresponds to the basic operating cycle of the data processor and has a period corresponding to the interval allotted in the processor to operate on a "word" of information.

Each basic operating cycle thus provides a time interval for performing a portion of the over-all data processing operations to be carried out; and, at the end of each basic operating cycle, the control system is reset to provide for the operations to be performed during the subsequent operating cycle. Such a program control apparatus has been described in a copending application, Serial No. 720,384, filed on March 10, 1958, now Patent No. 3,042,305 and assigned to the same assignee. The control system therein described operates by effectively employing non-linear devices and latching circuits, i.e., signal holding circuits, for selectively generating control signals for the logical networks, which control signals continue throughout the period allotted to operating on a word of information during an operations-interval. The present invention is directed to an improved control system for data processors which eliminates the need for latching circuits by utilizing a selected pulse-driven transformer to supply a series of control signals which can be directly coupled to the logical networks during each operations-interval.

The program control system of the present invention comprises an array of transformers. Each transformer is assigned to control the logical operations during a word period as described by a respective operations-interval. The array of transformers is arranged in columns and rows, such that signals applied to a selected column and row complete a circuit to enable timed drive-pulses to be supplied for the duration of a word period to one of the transformers to produce program control pulses, generally designated PCS, on the sense lines coupled to the selected transformer. Each transformer thus produces on each of the sense lines coupled to it, during the word period that the transformer is selected to operate, a series of control pulses which are applied to the logical networks.

Although the transformers of the program control array may be selected in a fixed sequence, to cause performance of data processing operations, on successive operating cycles, generally this would not be the case, since the set of operations performed during a specific operations-interval may be succeeded by itself in a repeat or "sticking" procedure, or one or more of the operation-intervals may be skipped over by suitable logical control of the selection of the transformers.

From the foregoing general description, it is evident that in the operation of the data processor, a single transformer must be selected for providing control signals to those circuits which are to be operable during each operations-interval, and sequential selection of predetermined ones of the transformers provided for execution of a "command," i.e., a particular mode of operation of the data processor.

More particularly in the preferred embodiment of the program control apparatus of the present invention, column and row lines are provided for an array of transformer cores. The column drive line for each column of the array is coupled to one end of each of the primary or drive windings provided on the respective transformer cores in the column; and the row drive line for each row of the array is coupled to the other end of each of the drive windings provided on the respective transformer cores in the row. The transformer cores are normally biased to an inactive state by bias current passed though a main bias line coupled to each transformer core in the array whereby each core is driven into saturation in the absence of drive current pulses passing through the primary or drive winding of the respective transformer. The selected transformer core is driven from the biased state by drive current pulses passing through the transformer drive winding from the row drive line common to a row of transformers.

The selection of the proper column and row drive lines of a transformer core in the array is provided for by two contemporaneously operating arrangemetns of flip-flops, one arrangement of flip-flops has its outputs connected through a column decoder to select a particular column drive line and a similar arrangement of flip-flops has its outputs connected through a row decoder to select a particular row drive line for closing a circuit through the primary winding of the coordinately selected transformer. The decoder associated with the row drive lines applies timing pulses to turn on a transistor in a selector row line, while the decoder associated with the column drive lines applies a signal to turn on a transistor in a selected column line to complete the coordinate selection of the transformer to enable drive pulses to be applied on the selected transformer primary winding during the time interval of a word period.

Each transformer of the array has a set of one or more secondary windings or sense lines inductively coupled to its respective core whereby the drive pulses upon turning over the transformer core against the bias produces program control signals, generally designated PCS, on each line of that set of sense lines. The signal output on a sense line is a logical signal having such a waveform that it can be directly combined with other logical signals in the logical networks to render these networks operative during the operations-interval corresponding to the selected transformer in the array. It should be understood that a particular sense or PCS line is in the usual case inductively coupled to more than one transformer core in the array whereby a control signal is produced on that sense line whenever drive pulses are coupled to any one of these transformer cores. It should be clearly undesrtood that the transformers are selected one at a time by the setting of the column and row flip-flops and that one transformer corresponds to each operations-interval. Resetting the column and row flip-flops at the end of each word period or operations-interval is then effective to change the coordinate selection of the transformers to proceed to the next operations-interval.

From the preceding general description, it is evident that by employing transformers in which each transformer represents and controls processor operations during an operations interval corresponding to a word period, a set of logical circuits can be controlled and timed in operation without the need of holding or latching circuits for maintaining the desired control signals for the duration of time allotted to performing on a word during an operations-interval.

It is thus an object of the invention to provide an improved computer program control system and apparatus therefor.

Another object of this invention is to provide novel circuitry in a data processor for selecting various forms of logical circuitry to be operable during each operations-interval allotted to the execution of a command.

Another object of the invention is to provide a program control device comprised of an array of transformers, each transformer operating in response to drive signals on its primary winding to provide on one or more of its secondary windings output signals having such a waveform that they can be directly combined with other logical signals in a logical network.

Other objects and features of the invention will become apparent to those skilled in the art as the disclosure is made in the following detailed description of a preferred embodiment of the invention as illustrated in the accompanying sheet of drawings in which:

FIG. 1 is a schematic diagram showing a portion of a data processing system controlled by the program control apparatus of the present invention;

FIG. 2 is a detailed circuit diagram of a typical but simplified portion of the program control apparatus illustrated schematically in FIG. 1;

FIG. 3 is a diagram illustrating the operational characteristic of one of the transformers used in the program control apparatus;

FIG. 4 shows the time relationship of the various clock and timing signal waveforms generated in the operation of the program control apparatus;

FIG. 5 shows the waveforms of the signals used in selecting and driving a transformer and also the waveforms of the control signals generated by the selected transformer during each operations-interval of the apparatus of the present invention; and FIG. 6 shows typical waveforms of the logical signals applied to the inputs of an arithmetic network during selected time periods to illustrate the operation of the program control apparatus.

Referring now to the drawings, wherein like reference characters designate like or corresponding parts throughout the several views, there is shown in FIG. 1, a program control apparatus 11 for supplying control signals, such as signals PCS1, PCS2, PCS3, etc., to a logical network 12 for selective control of the logical operations to be performed by the networks during individual word periods, i.e., operations-interval of a computer routine.

Included within the program control apparatus is a program control transformer array 16 in which the transformers are individually selected to be operative by a coordinate circuit arrangement. To select one of the transformers 15, column flip-flops N1–N3 supply signal inputs to a decoder 20 which is effective to complete a drive circuit including one of the column drive lines KO–KO7, while row flip-flops N4–N6 supply signal inputs to a decoder 28 which is effective to complete a drive circuit including one of the drive lines RO–RO7. As will be explained more clearly in connection with FIG. 2, the drive circuits are arranged such that the selected transformer is capable of being energized to supply control signals to its assigned circuits in logical network 12 during the word period allotted to an operations-interval.

The column flip-flops N1–N3 have outputs $N_1$–$N_3$ coupled to column decoder 20 which supplies an output signal for switching a selected one of a group of column drivers 22. For example, a low signal output $ko$ from decoder 20 coupled to the base of the PNP switching transistor 24 turns this transistor on to complete a circuit from the column drive line KO through the transistor to ground 26. The selection of one of the row drive lines RO–RO7 is accomplished in a similar manner by the row flip-flops N4–N6 having outputs $N_4$–$N_6$ coupled to the row decoder 28 which supplies an output signal for switching a selected one of a group of row drivers 32. The selection of a row drive line in the row decoder 28 is insufficient in itself to provide the desired signal input to the selected one of the row drivers 32, and an additional signal in the form of delayed timing signals $C_d$ is provided for this purpose. A clock source 14 supplies timing signals $C_s$ at a predetermined rate, e.g., 166 kc./sec., and these timing signals are coupled to the delay circuit 30 to provide the slightly delayed timing signals $C_d$ (see FIG. 4). The delayed signals $C_d$ are gated by the decoder 28 to the selected one of the group of row drivers 32 to produce voltage drive pulses $C_x$ on one of the row drive lines of array 12. For example, delayed timing signals $C_d$, coupled to the decoder 28, are selectively gated by the decoder to provide signal $ro$ (see FIG. 5(c)) on the base of NPN transistor 34. This transistor functions as a switch connecting the source of $-10$ v. to the drive line RO. The control of the conduction through transistor 34 by the signal $ro$ produces drive pulses $C_x$ on the drive line RO, as indicated by the voltage waveforms shown in FIG. 5(f).

A selection of a column drive KO and a row drive line RO, in the manner described, provides for coordinate selection of transformer 0—0 which is driven by drive pulses $C_x$ to produce program control signals on each of the sense lines coupled to the transformer, such as sense line 36, as will be explained more fully in the discussion of the operation of a typical portion of the program control apparatus illustrated in FIG. 2. The sense lines, such as sense line 36, inductively coupled to transformer 0—0, are connected to supply PCS signals, such as PCS1 signals, to the inputs of chosen ones of the circuits included in logical network 12, such as the "and" network 38, whereby other logical signals applied to the inputs of network 38 can be combined during the operations-interval corresponding to the selection transformer 0—0. As shown in FIG. 6, the control signals PCS1 are timed to occur such that their control pulse portions 9 are at a low potential prior to and during the time interval of the corresponding clock pulses C. The control pulse portions 9 are low for approximately one-half of a clock period and are timed to provide an adequate time period for transients to settle in the network 12 before the occurrence of the clock pulse C. As shown in FIGS. 5(a) and 5(h), a clock pulse C occurs during the period of the corresponding control pulse portion 9, and near its trailing edge.

As shown in FIG. 1, the timing signals $C_s$ derived from the clock source 14, are coupled to a pulse shaper 40 to produce clock pulses C which are of a very short time duration relative to the timing signals $C_s$, and of higher amplitude, as indicated by the typical clock pulse waveforms in FIGS. 4(a) and 4(b). As indicated, the clock pulses C are derived from the leading edge of the timing signals $C_s$ in the pulse shaper 40. The timing signals $C_d$ are derived by delaying signals $C_s$ in delay 30. The drive pulses $C_x$ applied on a selected one of the row drive lines RO–RO7 are amplified timing signals $C_d$ and the delay, provided by the delay circuit 30, is adjusted whereby the negative potential pulse portions 9 of the control signals produced by the drive pulses $C_x$ coincide in time with the clock pulses C, as indicated in FIGS. 5(a) and 5(h). The need for this timing in the operation of the circuits will be more evident in the discussion of a typical operation of the system, infra.

In addition to supplying the clock pulses C directly to the logical network 12, the clock pulses C are also coupled to a P counter for defining four full intervals of time which are respectively designated clock pulse periods $P_0$, $P_1$, $P_2$ and $P_3$. The P counter has correspondingly designated output lines, each of which is changed from a high potential to a low potential, in sequence, for only the duration of a clock pulse period. The output lines of the P counter are coupled to the logical network 12 to define the clock pulse periods $P_0$–$P_3$ in the circuits of the logical network 12. The output line $P_3$ is also coupled to activate the D counter which defines the sixteen equal intervals of time, designated digit periods, comprising the word period of the data processor. The D counter has correspondingly designated output lines, each of which is changed from a high potential to a low potential state for only the duration of its respective one-sixteenth of an operating cycle to provide operating potentials to the logical network 12. For example, the output lines $D_{15}$ and $P_3$ provide the necessary combination of low potential signals to define the time for changing the state of the column and row flip-flops N1–N3 and N4–N6 at the end of a word period to prepare the program control apparatus 11 for the subsequent operations-interval. Accordingly, and in a well-known manner, triggering signals $n_1$–$n_3$ and $n_4$–$n_6$ for the column and row flip-flops, respectively, are provided at the end of each operations-interval, for changing the state of these flip-flops to select another one of the transformers 15 in the array 16, whereby the program control signals required in the performance of the next operations-interval, are generated.

In FIG. 2, a detailed circuit diagram of a selected group of transformers in the transformer array 16 has been shown along with associated program control circuits, in order to simplify the description of the operation of the program control apparatus 11. Each of the transformers 15 in the array 16 includes a magnetic core 42 having a primary or drive winding 44 whereby the voltage drive pulses $C_x$ applied on the winding of a selected transformer induces PCS control signals in the respective secondary windings or sense lines threaded through the respective core. It is important to note that the showing in FIG. 2 is extremely simplified in that only one or two sense lines are shown coupled to each transformer core, whereas in practice there may be an average of as many as fifty to one hundred or more such sense lines coupled to each core. Each of the drive windings 44 is connected in series with a respective rectifier 46 to limit the current path from the drive lines to the drive winding of a single coordinately selected transformer 15. Circuits for passing drive current through drive windings 44 are selectively completed to ground 26 through respective transistors 24 having their respective collectors connected to respective column drive lines. The row drive lines are connected to the collectors of respective transistors 34, each of which has a base connected through an inverter 33 to a respective "and" gating circuit, such as circuit 48, for gating timing signals $C_d$ to drive the respective transistor 34 upon selection of the respective row drive line by the flip-flops N4–N6, as shown in FIG. 1. For example, low potential outputs of the flip-flops $N_4'$, $N_5'$, and $N_6'$ provide low potential inputs at the network 48 for gating timing signals $C_d$ which, after inversion in inverter 33, are used to drive the transistor 34, coupled to drive line RO, to produce drive pulses $C_x$ on the drive line RO.

Referring again to the individual transformers 15 shown in FIG. 2, it will be noted that each of the transformers is biased by a main bias line 50 which is passed as a single turn winding through the aperture of each transformer core 42 in the transformer array 16 whereby all cores in the array are driven into saturation in the same direction and held there in the absence of drive currents in the primary winding 44 of the respective transformer. The bias magnetizing force produced in each of the cores is in a direction opposite to the magnetizing force produced in the core by drive pulse currents in the drive winding 44. The primary consideration in determining the magnitude of the bias current is the time interval in which a transformer core 42 must be returned to saturation in its biased state of saturation to prepare it for the succeeding drive pulse $C_x$ passing through its respective drive winding 44. For example, drive pulses $C_x$ applied on the drive winding 44 of transformer O—O, drive the respective transformer core 42 out of saturation in its biased state; and the bias current $I_B$, indicated in FIG. 5(k), must be of sufficient magnitude to return the core to its biased state in the time interval between succeeding drive pulses $C_x$. The return of the core 42 to a biased state is indicated by the high potential portion 13 of the voltage waveform of the PCS signals as shown in FIG. 5(h).

The program control signals PCS are induced in single turn secondary windings or sense lines inductively coupled to selected transformer cores during respective work periods. Each transformer 15 of the array 16 has, in the usual case, a plurality of sense lines inductively coupled to its respective core whereby drive current pulses on its respective drive winding induce control signals PCS on each line of that set of sense lines. As indicated previously, the circuit diagram of FIG. 2 is simplified and in practicing the invention anywhere up to fifty or even more sense lines may comprise a set.

The operational characteristics of a typical transformer, such as transformer O—O, are such that a 2.5 volt negative control pulse will be sustained for the desired period e.g., one-half of a clock pulse period and preferably the transformer core material is characterized by a rectangular hysteresis loop, high permeability and low coercivity. The latter characteristics of the preferred transformer core, i.e., low coercivity, specifies a core having a rectangular hysteresis loop which is narrow in width to minimize the coercive force necessary to drive the core from one state of saturation to the other. A further desirable characteristic of the transformer core is one having low eddy current losses. A laminated core, therefore, would be preferable wherein the laminations tend to reduce the eddy current losses. A material for forming toroidal transformer cores of the desired characteristics enumerated above may be Permalloy, a nickel-iron alloy having a high percentage of nickel, e.g., 78% nickel and 22% iron. A transformer 15 using a toroidal core having the aforementioned desirable characteristics provides a minimum of distortion of the drive pulses $C_x$ to produce PCS control signals having low potential control pulse portions 9 which follow the drive pulses $C_x$ and are substantially replicas of the drive pulses $C_x$. Control pulse portions 9 of a PCS signal remain low for substantially the same time period as drive pulses $C_x$, e.g., one-half of a clock pulse period, whereby an adequate time interval is provided for stabilizing of the operations of the logical circuits to which the PCS signals are applied before the occurrence of the clock pulse C.

Although the primary consideration in determining the magnitude of the bias current $I_B$, as indicated previously, is to drive a core back into saturation in its biased state, in the time interval between the pulses $C_x$, another important consideration is the effect of the PCS control signal currents on a sense line which passes through one or more transformer cores 42, in addition to the core of the selected transformer which induced the control signals PCS on the sense line. The use of a bias current $I_B$ of sufficient magnitude reduces the spurious signal outputs on sense lines which are not coupled to a selected driven transformer 15 during a given operations-interval. To illustrate the foregoing, reference is made briefly to FIG. 2. During operations interval #0, transformer O—O is driven by drive pulses $C_x$ to produce PCS control signals on sense line 36. Sense line 36 passes through the core 42 of transformer O-O1 before being connected ultimately to the logical "and" gate 38. The control signal current $I_{PCS1}$ on sense line 36 represents a spurious magnetizing current signal when coupled through the core of transformer O-O1, and will produce a magnetizing force changing the flux of the core wherein the amount depends upon the biased state of the core and the core material. In order to minimize the spurious signals, the change in the flux of the core transformer O–O1 in response to the control signal current $I_{PCS1}$ is minimized by biasing the cores of the transformers 15 by a bias current $I_B$. In FIG. 3, a curve 52 similar to the magnetization curve of the preferred transformer cores 42, with the state of flux $\phi$ plotted against magnetizing current $I_m$, is shown wherein the diagram is simplified in that no hysteresis loop is shown. During operations interval #0, control signal current $I_{PCS1}$, having the direction and amplitude indicated, are passed through sense line 36 which is threaded through the aperture of the core of transformer O–O1. As shown in FIG. 3, the magnetizing current $I_{PCS1}$ is opposed to the bias magnetizing current $I_B$ and produces small changes of flux $\Delta\phi$ in the core of transformer O–O1 during operations-interval #0. Since the core of transformer O–O1 is normally biased to saturation at the point 53 on the curve 52 the flux will vary only slightly in response to $I_{PCS1}$, as indicated by $\Delta\phi$. Since there is little change in flux there is only a slight change in voltage 70 induced on the sense line 58, and spurious signals on sense line 58 are minimized. Further, the direction of the current through the sense line 58 is such that the voltage potential induced by the slight changes in flux $\Delta\phi$ is opposite to that of the PCS1 control signals, i.e., when the PCS1 control signal is low during the logical pulse portion 9, the spurious signal voltage induced by the change in flux is high. Therefore any spurious signal voltage would be ineffective as a logical input even if it were of the required magnitude duration.

Reference will next be made to FIGS. 1, 2, 5 and 6 for a discussion of the operation of the program control apparatus upon successive selection of transformers O—O, O–O1 and O1—O1 of array 16. A selection of transformer O—O is made to control predetermined processing operations which are to be performed during an operations-interval, to which this transformer is exclusively committed, by setting the column and row flip-flops N1–N3 and N4–N6 by input triggering signals $n_1-n_3$ and $n_4-n_6$, respectively, as derived from the logical network 12. The coordinate selection of drive lines KO and RO maintains a connection of the drive line KO to ground 26 through the PNP transistor 24 for the duration of the operations-interval #0, and intermittently connects, in accordance with inverted timing signals $C_d$, the drive line RO to the −10 v. source through the NPN transistor 34. The output of transistor 34, thus produces drive current pulses in the drive winding 44 which pulses are limited in amplitude primarily by the impedance of the transformer O—O, i.e., the transformer O—O is voltage driven. The current path is from the −10 v. source through the pulsed transistor 34, through the rectifier 46, the drive winding 44, column drive line KO, and the transistor 24 to ground 26. During operations-interval #0, the waveform on the base input $ko$ of transistor 24 is shown in FIG. 5(b); the waveform of the pulses on the base input $ro$ of transistor 34 is shown in FIG. 5(c); and the waveform of the drive pulses $C_x$ on the drive winding 44 of the transformer O—O is shown in FIG. 5(f). The magnetic force produced in the respective core by these drive pulses $C_x$ overcomes the magnetic force produced by the bias $I_B$, shown in FIG. 5(k), to induce control signals PCS1 on the sense line 36 during operations-interval #0, as shown in FIG. 5(h). The PCS1 signals are coupled to control the "and" network 38, as shown in FIG. 1. Thus, concurrent low potential logical signals at inputs $A_1$ and $B_1'$ of the "and" network 38, will produce a low potential logical output signal during the control pulse portion 9 of the PCS1 signal, which is coupled as signal $b_2$ through a summing diode 64 to the line 56.

At the end of the operation-interval #0, i.e., at the end of clock pulse period $D_{15}P_3$, the column flip-flops N1–N3 are reset by triggering inputs $n_1-n_3$ to change the selection of array 16 from column KO to column KO1, as indicated by waveforms 5(b) and 5(d), to render the transformer O—O inoperative and transformer O–O1 operative. The row flip-flops N4–N6 need not be changed for the coordinate selection of transformer O–O1. As shown in FIG. 5(d) during operations-interval #1, the potential level of decoder output $ko1$ is changed from a high potential level to a low potential level, such that the transistor 24 coupled to the column drive line KO1 is switched on to pass the drive pulses $C_x$ produced on the row drive line RO through the drive winding 44 of the transformer O–O1. This driving of transformer O–O1 produces control signals PCS1 and PCS2 on the sense lines 36 and 58, respectively, which are coupled to its core. As shown in FIG. 1, the sense lines 36 and 58 are coupled to diode gating networks 38 and 60 to continuously provide low potential control signals at the PCS1 and PCS2 inputs thereof during operations-interval #1, as shown by the waveforms of the control signals PCS1 and PCS2 in FIGS. 5(h) and 5(i). The diode gating networks 38 and 60 produce logical output signals $b_2$ which pass through respective summing diodes 64 and 66 whenever either $A_1B_1'$ or $A_1'B_1$, are at a low potential upon the occurrence of control pulse portions 9 of the PCS1 or PCS2 control signals. At the end of operations-interval #1, the selection of row drive lines is changed by triggering flip-flops N4–N6, such that decoder 28 applies a signal on $ro1$ (FIG. 5(e)) to render row drive line RO1 conductive. As a result of this action production of drive pulses $C_x$ on the drive line RO is discontinued and production of drive pulses $C_x$ on drive line RO1 is started and continued during operations interval #2, as shown by waveforms 5(f) and 5(g), respectively. As a result of this coordinate selection, the transformer O1—O1 is energized by currents produced by drive pulses $C_x$ and passing through the respective drive winding 44 to produce control signals PCS2 and PCS3 on the respective sense lines 58 and 62. The control signals PCS2 and PCS3, as shown in FIGS. 5(i) and 5(j), are applied to the inputs of arithmetic networks to control the networks during operations-interval #2 in which time interval the data processing operations of the specific operating cycle, to which the transformer O1—O1 is assigned, are performed.

In FIG. 6, waveforms of typical signals have been shown to illustrate the operation of a typical selected arithmetic network 38 having inputs $A_1$ and $B_1'$ supplied from memory register flip-flops, as shown in FIG. 1, during pulse periods $D_{15}P_3$ and $D_0P_0$ which are the pulse periods occurring at the end of operations-interval #1, and at the beginning of operations-interval #2, respectively. The purpose in showing these pulse periods is to illustrate the effect of a discontinuation of PCS1 control signals, when the remaining logical inputs to the arithmetic network 38 do not change, and to illustrate the spurious signal voltages 70 induced on sense line 36 by the control pulses PCS2 on sense line 58 due to the resulting change in flux produced in the core of the selected transformer O1—O1. As indicated in FIG. 6(b), the generation of control signals PCS1 is discontinued at the end of operations-interval #1. Thus logical output $b_2$ is produced upon concurrent application of $A_1$ and $B_1'$, and pulse portion 9 of a PCS1 signal during $D_{15}P_3$; however, on discontinuance of the control signals PCS1 at the beginning of operations-interval #2, spurious signals only are induced on the sense line 36. Therefore, no signals $b_2$ will be present on line 56 during $D_0P_0$ of operations-interval #2, even though input signals $A_1$ and $B_1'$ have not changed and remain at the low logical potential level. In examining the spurious signals induced on sense line 36, it will be noted that the signals go positive when the control signals PCS would normally go negative, which accounts for the delay in the change in level of control pulse portion 9 of a PCS1 signal to a low potential, as discussed previously in the disclosure. It will also be noted that the negative spurious signal 70 occurs after the clock pulse C, and therefore, would not affect the operation of the logical circuits in the network 12, even if it were possible to reach the low potential amplitude of the control pulse portions 9 of the PCS1 signals.

In the foregoing description, a preferred embodiment has been disclosed which is directed to a system for obtaining PCS control signals in which the time-integral of the voltage signal is relatively large, being on the order of 7 to 8 volt-microseconds. Larger volt-microsecond integral capacities may be employed to obtain control pulses of greater amplitude and for longer duration. This is obtained by increasing the size of the transformer cores or by using other suitable means for increasing the volt-microsecond signal capacity of a selected transformer, such as, for example, by using two or more transformer cores for coupling the drive pulses to the respective sense lines associated with one of the coordinate positions of the program control array. In practice, the advance of the state of the art of data processors is toward higher speed equipment, which shortens the clock pulse period operation of the circuits. The present invention finds greater utility and ease of application with higher speed equipment or other modes of operation which lend themselves to providing control signals of lesser duration, since control pulses having a lower potential or shorter duration or both reduces the size requirements of the transformer cores or the flux density requirements of the core material due to the decrease in the required volt-second signal output. In addition, the operation of the transformers having smaller volt-second integrals is faster because it requires less time to drive the core from one state to another.

While a preferred embodiment of the invention has been specifically disclosed, it is understood that the invention is not limited thereto, as many variations will be readily apparent to those skilled in the art and the invention is to be given its broadest possible interpretation within the terms of the following claims.

What is claimed is:

1. A circuit arrangement comprising: an array of transformers each having a respective core, a single primary winding, a set of at least one secondary winding, biasing means including a bias winding for each of said cores, and selective circuit means, including a source of voltage, capable of being operate dto select any one of said transformers and in any desired order to selectively couple said source of voltage across the primary winding of a selected one only of the transformers of the array to thereby couple said voltage to the set of at least one secondary winding of the respective transformer.

2. A circuit arrangement for forming program control signals comprising: an array of pulse transformers each of said transformers having a respective core, primary winding, bias winding, and a set of at least one secondary winding; means for providing a source of predetermined voltage waveform drive pulses; and selective circuit means coupled to said primary windings for selectively coupling a series of drive pulses to the primary winding of any one only of the transformers during an operating interval consisting of a multiplicity of said drive pulses to induce a series of program control pulses of a predetermined and approximately constant logical potential level in the set of at least one secondary winding of the respective transformer.

3. Apparatus for generating program control logical signals for controlling logical networks of a data processor, comprising: an array of transformer means; drive lines for said transformer means; a set of one or more sense lines inductively coupled each to at least one of said transformer means and at least one of said sense lines inductively coupled to a plurality of said transformer means; a source of timing signals; and selecting means coupled to said drive lines and said source to produce voltage pulses and selectively apply said voltage pulses to a single one of said drive lines to thereby couple said voltage pulses to any selected one only of said transformer means in said array, said selected one of said transformer means being responsive to said voltage pulses to provide a series of control logical signals synchronized with the timing signals on the sense lines of said selected transformer means.

4. In a data processor including a plurality of logical networks for performing data processing operations on successive operating cycles in response to application of control pulses to specific ones of said logical networks wherein signals of a predetermined and substantially constant logical potential level are necessary to render said logical networks effective, a control device for said data processor, comprising: signal generating means for producing a series of drive signals; an array of transformers; drive lines for each of said transformers; sense lines coupled to predetermined ones of said transformers and to respective ones of the logical networks; and selection means, coupled to said signal generating means, for selecting the drive lines of any one only of said transformers to produce a series of voltage drive pulses, each pulse being of substantially constant voltage, and couple said series of pulses to said transformer, said transformer being responsive to said series of pulses to couple said series of pulses to the respective sense lines coupled to said transformer during an operating cycle to provide on the sense lines, control pulses of a predetermined and substantially constant logical potential level, whereby during each of said operating cycles said control device is effective to determine and carry out specific logical operations according to the logical networks rendered effective by said control pulses.

5. A control system for a digital data processing system whose operations are sequentially divided into fixed operations-intervals, comprising, in combination: an array of transformer cores; sets of data processing means; a plurality of control lines, each connected to a respective set of said data processing means, and each control line being inductively linked to a set of at least one of said transformer cores; and means including transformer core selecting means and pulse driving means, said transformer core selecting means being cyclically operable to select any single selected one transformer core only of said array, one transformer core for each operations-interval, said pulse driving means producing a series of pulses to drive the selected transformer core to thereby form a series of control signals on each control line inductively linked thereto.

6. A circuit arrangement for forming series of program control signals comprising: an array of pulse transformers each of said transformers having a respective core, primary winding, bias winding, and a set of at least one secondary winding; circuit means for supplying current to the bias windings of the transformers for biasing the transformer cores in a predetermined state; means for providing a source of substantially constant voltage amplitude drive pulses; and selective circuit means coupled to said primary windings for selectively coupling a series of said drive pulses to the primary winding of any one only of the pulse transformers to change the state thereof against the bias during an operating interval consisting of a multiplicity of said drive pulses to couple a series of said drive pulses of a predetermined and substantially constant logical potential level to the set of at least one secondary winding of the respective pulse transformer to provide said series of program control signals.

7. A digital data processing control system comprising in combination: an array of transformer cores; a plurality of sets of data processing means; a plurality of control lines, each connected to a respective set of said data processing means, and each control line being inductively linked to a set of at least one of said transformer cores; and transformer core selecting and pulse driving means operable to select and repetitively drive a transformer core of said array from a voltage source, said transformer cores having a volt-microsecond integral capacity to be responsive to said pulses to produce a series of control pulses of substantially constant voltage amplitude on each control line inductively linked to the selected transformer core for rendering a respective set of said data processing means operable.

8. A program control circuit arrangement for providing logical control input signals having a predetermined logical potential level and waveshape for controlling the operation of logical circuits of a digital data processor during sequential operations-interval comprising: a plurality of transformers each having a respective core, primary winding, bias winding, and a set of at least one secondary winding coupled directly to respective ones of the logical circuits; circuit means for producing a current in the bias windings for biasing the cores in a predetermined direction; and selective circuit means including a source of timing signals for generating drive signals having said predetermined waveshape on the primary winding of any selected one transformer during an operations-interval to repetitively produce a magnetizing force in a direction opposite to said bias and an approximately constant rate of change of magnetic flux for the time period of each drive signal thereby inducing said logical control input signals on a respective set of at least one secondary winding to enable respective ones of the logical circuits to be operative.

9. In a control system, the combination comprising: a plurality of transformers each having a respective core, primary winding, set of secondary windings, and a bias winding for providing current for biasing the cores in a predetermined state; a source of timing signals; a selective circuit means coupled to said source and to the primary windings of the transformers for selectively producing substantially constant voltage level drive signals, synchronized with said timing signals, through a single primary winding of any one selected transformer said selected transformer being responsive to a drive signal applied to the selected transformer primary winding to couple said signal to the respective set of secondary windings to produce on each, a logical control signal of a predetermined potential level and substantially the same time period as said drive signal; and logical circuit means in which at least one logical circuit has a plurality of inputs and single control input only connected directly to one of said secondary windings for enabling said logical circuit to be operable whenever said secondary winding has a control signal induced thereon by the respective transformer.

10. A digital data processing program control system comprising in combination: a plurality of magnetic elements, a source of voltage pulses, each voltage pulse being of a substantially constant amplitude and predetermined minimum time duration for controlling the operation of logical circuits, each of said magnetic elements being of a predetermined size to provide a volt-microsecond integral capacity for producing a substantially constant rate of change in magnetic flux during the time period of each of said voltage pulses, selection means for selectively coupling said source to any one of said elements to produce a substantially constant rate of change in magnetic flux in said element during the time duration of each voltage pulse, a plurality of sense lines, at least one of said sense lines being inductively linked to a plurality of said magnetic elements and at least one of said magnetic elements being inductively linked to a plurality of said sense lines to couple at least one of said voltage pulses to the respective sense lines, a plurality of logical circuits, said sense lines being coupled to predetermined ones of said logical circuits to control the operation thereof in response to at least one of said pulses of a predetermined minimum time duration.

11. A digital data processing program control system comprising in combination: a plurality of magnetic elements; a source of voltage pulses of substantially constant amplitude; selection means for selectively coupling said voltage pulses to at least one of said magnetic elements to produce an approximately constant rate of change of magnetic flux in said selected magnetic elements during the time period of each of said voltage pulses, a plurality of sense lines, at least one of said sense lines being inductively linked to a plurality of said magnetic elements and at least one of said magnetic elements being inductively linked to a plurality of said sense lines for coupling said voltage pulses to respective sense lines, a plurality of logical circuits, each of said sense lines being coupled to predetermined ones of said logical circuits to control the operation thereof in response to voltage pulses coupled to said sense lines, said selection means being coupled to said logical circuits so that the selection made thereby is in accordance with the outputs of predetermined ones of said logical circuits.

12. In a data processing system having a plurality of logical circuits by means of which logical operations are performed during an operations-interval of said system, improved means for controlling said plurality of logical circuits during each operations-interval comprising: a plurality of sense lines, said sense lines being coupled to respective ones of said logical circuits so that a signal induced in a sense line is capable of controlling the operation thereof, a plurality of magnetic elements each of which corresponds to a particular type of operation to be performed during an operations-interval, each of said magnetic elements being inductively linked to those sense lines whose respective logical circuits are to be controlled to provide the particular type of operation to which each magnetic element corresponds, at least one sense line being inductively linked to a plurality of magnetic elements and at least one magnetic element being inductively linked to a plurality of said sense lines, and selection means capable of changing the state of a selected one of said magnetic elements to produce an approximately constant rate of change of flux therein so as to induce an approximately constant voltage signal on each of the sense lines inductively linked thereto, each selection means being coupled to said logical circuits so that the selected magnetic element is chosen in accordance with the results of predetermined logical operations performed during the previous operations-interval.

References Cited by the Examiner

UNITED STATES PATENTS

| 2,691,156 | 10/54 | Saltz et al. | 340—174 |
| 2,733,861 | 2/56 | Rajchman | 340—174 X |
| 2,776,419 | 1/57 | Rajchman et al. | 340—174 |
| 2,931,022 | 3/60 | Triest | 340—174 X |
| 3,032,747 | 5/62 | French | 340—174 |
| 3,042,305 | 7/62 | Edwards et al. | 235—157 |

FOREIGN PATENTS

Pages 213 to 222 (#15) May 1952, Proceedings of the Association of Computer Machine.

Pages 183–201, June 1952, RCA Review, vol. 13, No. 2.

IRVING L. SRAGOW, *Primary Examiner*.